(12) United States Patent
Li et al.

(10) Patent No.: US 9,146,018 B2
(45) Date of Patent: Sep. 29, 2015

(54) OPTICAL LENS AND BACKLIGHT MODULE INCORPORATING THE SAME

(71) Applicant: TVP Display Technology (Xiamen) Co., Ltd., Xiamen (CN)

(72) Inventors: Li-Mei Li, Xiamen (CN); Jun-Yi Zheng, Xiamen (CN); Po-lem Lin, Hsinchu (TW)

(73) Assignee: TPV Display Technology (Xiamen) Co., Ltd., Xiamen, Fujian (CN)

( * ) Notice: Subject to any disclaimer, the term of this patent is extended or adjusted under 35 U.S.C. 154(b) by 160 days.

(21) Appl. No.: 13/930,990

(22) Filed: Jun. 28, 2013

(65) Prior Publication Data

US 2014/0003033 A1  Jan. 2, 2014

(30) Foreign Application Priority Data

Jun. 29, 2012 (CN) .......................... 2012 1 0227219

(51) Int. Cl.
*F21V 13/04* (2006.01)
*G09F 9/35* (2006.01)
*G09F 13/22* (2006.01)
*G02B 19/00* (2006.01)

(52) U.S. Cl.
CPC ............ *F21V 13/04* (2013.01); *G02B 19/0028* (2013.01); *G02B 19/0061* (2013.01); *G09F 9/35* (2013.01); *G09F 13/22* (2013.01)

(58) Field of Classification Search
CPC ......... H01L 33/60; H01L 33/58; H01L 33/54; H01L 2924/12041; H01L 33/20; H01L 31/0232; H01L 33/405; H01L 33/38; H01L 33/46; H01L 51/5237; H01L 51/5262; H01L 33/52; H01L 51/5271; H01L 51/5275; H01L 27/14629; F21Y 2101/02; F21V 5/04; F21V 13/04; F21V 5/045; F21V 7/09; F21V 5/00; F21V 7/04; F21V 5/048; F21V 7/00; H04N 2201/03116; F21S 48/215; F21S 48/2212; F21S 48/1376; F21S 48/1266; Y10S 362/80; Y10S 425/808; G02B 27/095; G02B 19/0061; G02B 27/09; G02B 27/0966; G02B 6/00; G02B 6/0073; G02B 6/262; G02B 6/0055; G02B 6/0046; G02B 6/0031; G02B 6/0036; G02B 6/0066; G02B 2006/12102; G02B 27/00
See application file for complete search history.

(56) References Cited

U.S. PATENT DOCUMENTS

2009/0086498 A1*  4/2009  Condon et al. ................ 362/477
2009/0310356 A1*  12/2009  Laporte ......................... 362/239
2011/0305026 A1*  12/2011  Mochizuki .................... 362/308

* cited by examiner

*Primary Examiner* — Anh Mai
*Assistant Examiner* — Fatima Farokhrooz
(74) *Attorney, Agent, or Firm* — Curatolo Sidoti Co., LPA; Joseph G. Curatolo; Salvatore A. Sidoti (57) ABSTRACT

An optical lens is adapted for used in a light source that has an optical axis, and includes a light-entering surface, a light-exiting surface, and a modified reflection surface. The light-entering surface has two first ends. The light-exiting surface defines a light-exiting surface profile that is concave toward the light source and that has two second ends. The modified reflection surface defines two modified reflection surface profiles. Each of the first ends is connected to a corresponding one of the second ends by a corresponding one of the modified reflection surface profiles. The modified reflection surface profiles are concave in the same direction as the light-exiting surface profile.

16 Claims, 5 Drawing Sheets

OPTICAL LENS AND BACKLIGHT MODULE INCORPORATING THE SAME

CROSS REFERENCE TO RELATED APPLICATION

This application claims priority of Chinese Patent Application No. 201210227219.6, filed on Jun. 29, 2012.

BACKGROUND OF THE INVENTION

1. Field of Invention

The invention relates to an optical lens, more particularly to an optical lens having a modified reflection surface to direct light and a backlight module including the optical lens.

2. Description of the Related Art

Currently, a thin film transistor liquid crystal display (TFT-LCD) has been the main stream of a flat panel display with a liquid crystal module. Since the TFT-LCD is a non-active light-emitting display, a backlight module and a color filter are usually needed to respectively provide relatively uniform light brightness and more plentiful colors.

Figure 1:
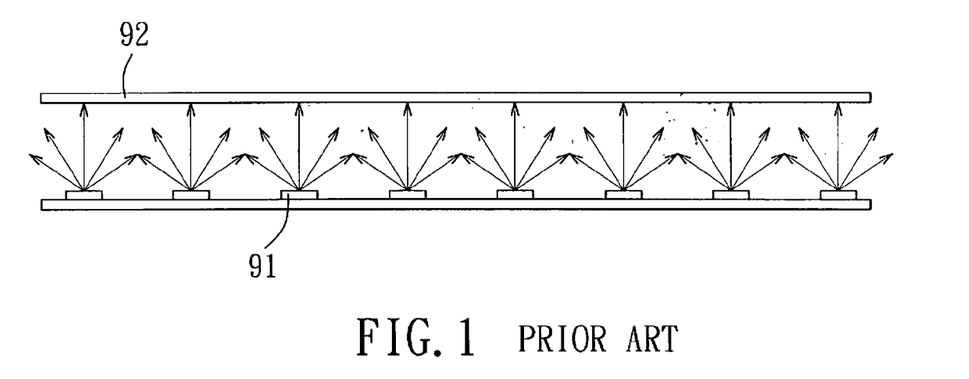
FIG. 1 is a schematic side view of a conventional backlight module without optical lenses.

Referring to FIG. 1, a conventional direct-type backlight module includes a plurality of light sources 91 and a film substrate 92. Since a light-emitting diode (LED) has a relatively small size and low energy consumption, the LED may be used as the light source 91 of the conventional direct-type backlight module. However, since the LED emits light in a Lambortian distribution, a relatively small-light spot is formed on the film substrate 92 right above the LED. Therefore, the conventional direct-type backlight module needs a greater number of LEDs as the light sources 91 for increasing the illumination area.

Figure 2:
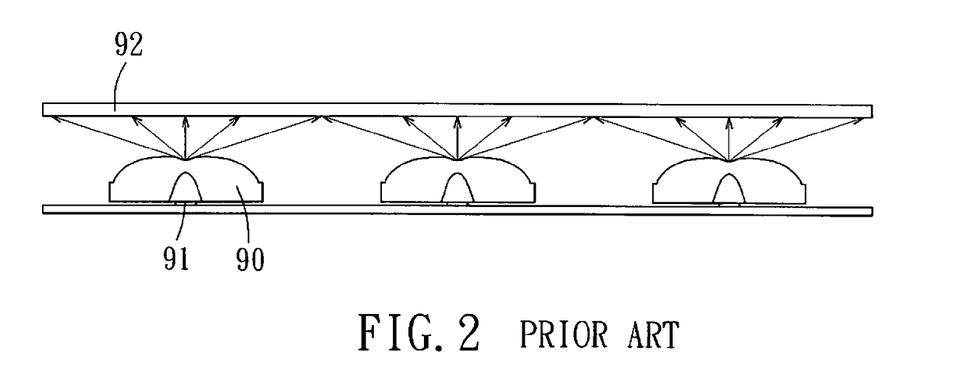
FIG. 2 is a schematic side view of the conventional backlight module with optical lenses.

Referring to FIG. 2, each of the light sources 91 is additionally covered by an optical lens 90 that is also called a secondary optical lens to vary the light distribution of the light emitted from the light source 91. The optical lenses 90 may increase the light scattering angles of the light emitted from the light sources 91, thereby reducing the height required for light mixing. With the addition of the optical lenses 90, the conventional backlight module can form a relatively larger illumination area and the number of the light sources 91 used is decreased so as to save the fabrication cost.

Figure 3:
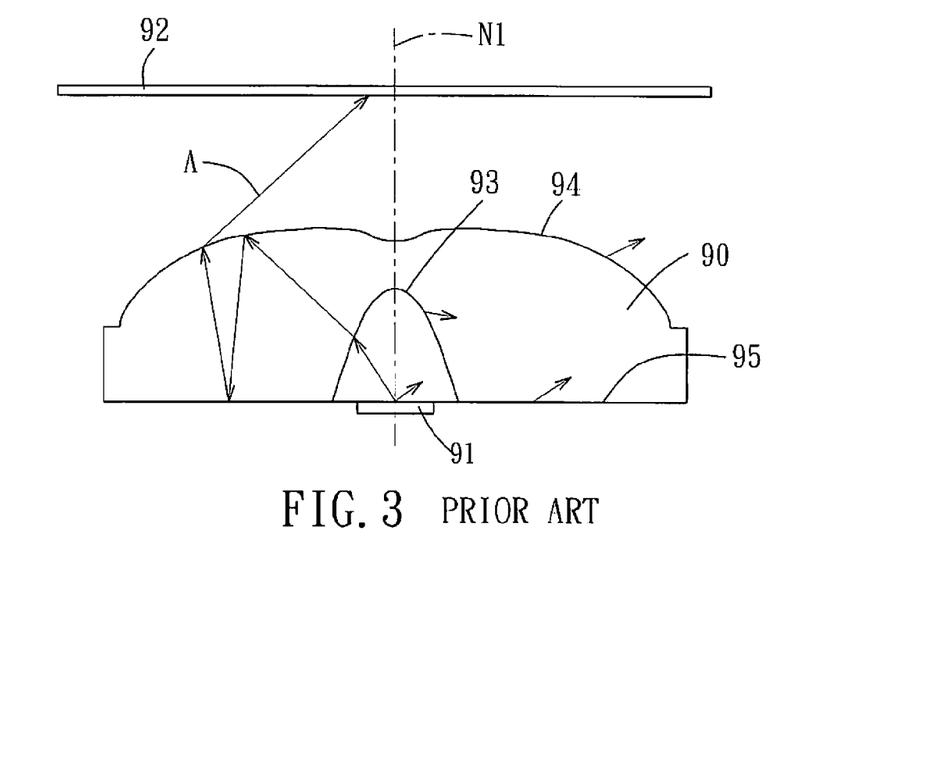
FIG. 3 is a schematic side view, illustrating how the optical lens of the conventional backlight module directs light emitted from a light source.

In order to increase the size of the light spot right above the light source 91 on the film substrate 92, a light-entering surface 93, a light-exiting surface 94, and a base surface 95 of the optical lens 90 are configured as described below, and as illustrated in FIG. 3. The light-exiting surface 94 has a substantially curved configuration. The base surface 95 has a substantially planar configuration. When the light (A) emitted from the lighting source 91 enters the base surface 95 and then exits the light-exiting surface 94, a part of the light (A) is reflected from the light-exiting surface 94 to the base surface 95. When the part of light (A) is reflected once again back to the light-exiting surface 94 from the base surface 95, the part of light (A) moves toward a central axis (N1) of the optical lens 90, creating the relatively high brightness around the central axis (N1), which results in an uneven light distribution on the film substrate 92.

SUMMARY OF THE INVENTION

Therefore, the object of the present invention is to provide an optical lens and a backlight module incorporating the same that can alleviate the aforesaid drawback of the prior art.

According to one aspect of the present invention, there is provided an optical lens with an optical axis adapted for use with a light source. The optical lens includes a light-entering surface, a light-exiting surface and a modified reflection surface.

The light-entering surface is disposed in proximity to the light source for entrance of light from the light source, and defines a light-entering surface profile on a cross section of the optical lens along a plane that passes through the optical axis. The light-entering surface profile is concave in a direction away from the light source, and has a first opening that opens toward the light source and two first ends that are respectively disposed on two opposite sides of the light source.

The light-exiting surface is spaced apart from the light-entering surface and remote from the light source, and defines a light-exiting surface profile in the cross section of the optical lens. The light-exiting surface profile is concave to define a second opening that opens toward the light source and that is relatively larger than the first opening, and has two second ends that are respectively disposed on two opposite sides of the first ends and remote from the light source.

The modified reflection surface defines two modified reflection surface profiles in the cross section of the optical lens. Each of the first ends is connected to a corresponding one of the second ends by a corresponding one of the modified reflection surface profiles. The modified reflection surface profiles are concave in the same direction as the light-exiting surface profile.

According to another aspect of the present, a backlight module includes a film substrate, a light source, and an optical lens with an optical axis and disposed between the film substrate and the light source. The optical lens includes a light-entering surface, a light-exiting surface and a modified reflection surface.

The light-entering surface is disposed in proximity to the light source for entrance of light from the light source, and defines a light-entering surface profile on a cross section of the optical lens along a plane that passes through the optical axis. The light-entering surface profile is concave in a direction away from the light source, and has a first opening that opens toward the light source and two first ends that are respectively disposed on two opposite sides of the light source.

The light-exiting surface is spaced apart from the light-entering surface and remote from the light source, and defines a light-exiting surface profile in the cross section at the optical lens. The light-exiting surface profile is concave to define a second opening that opens toward the light source and that is relatively larger than the first opening, and has two second ends that are respectively disposed on two opposite sides of the first ends and remote from the light source.

The modified reflection surface defines two modified reflection surface profiles in the cross section of the optical lens. Each of the first ends is connected to a corresponding one of the second ends by a corresponding one of the modified reflection surface profiles. The modified reflection surface profiles are concave in the same direction as the light-exiting surface profile.

The beneficial effect of the present invention resides in that by way of the design of the entire optical lens with the modified reflection surface, a part of the light is diffused away from the optical axis after a secondary reflection and a part of the light entering the modified reflection surface from outside is reflected away from the optical axis. Accordingly, the light is evenly distributed around the optical axis to avoid unduly high brightness around the optical axis.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail with reference to the accompanying preferred embodiments, it should be noted herein that like elements are denoted by the same reference numerals throughout the disclosure.

Figure 4:
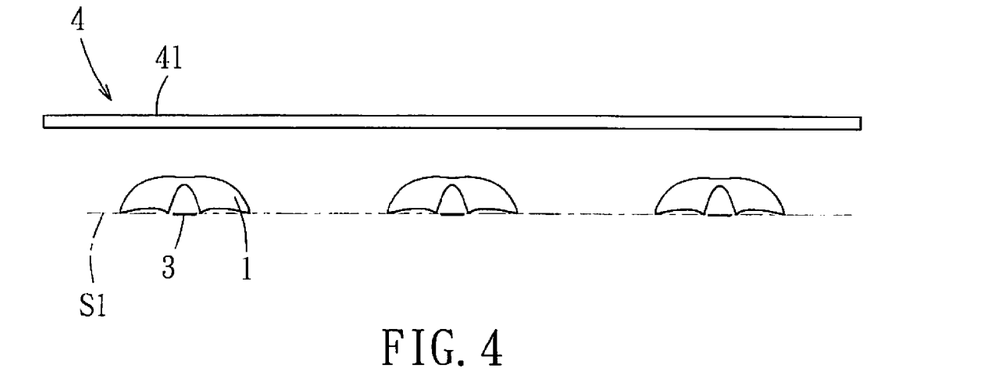
FIG. 4 is a schematic side view of the first preferred embodiment of a backlight module with an optical lens according to the present invention.
Figure 5:
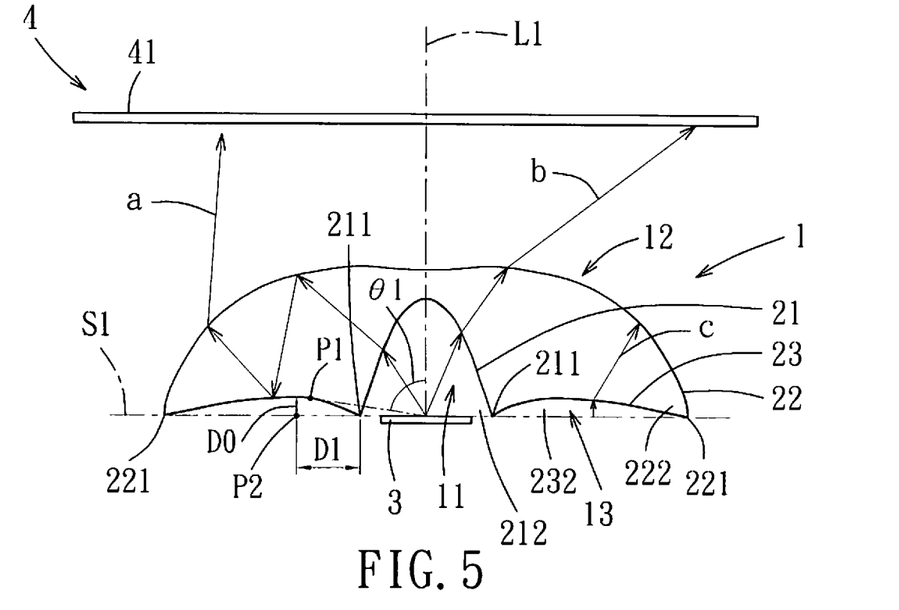
FIG. 5 is a schematic side view of the first preferred embodiment, illustrating how light travels in the backlight module from a lighting source through the optical lens to a film substrate.

Referring to FIGS. 4 and 5, the first preferred embodiment of a backlight module 4 according to the present invention is illustrated. The backlight module 4 includes a film substrate 41, at least one light source 3 that has an optical axis (L1), and an optical lens 1 disposed between the film substrate 41 and the light source 3. In this preferred embodiment, the backlight module 4 is adapted to be applied in a display device such as an LCD display or an LCD-TV set and may be an edge type or a direct type. The first preferred embodiment of the backlight module 4 exemplified in FIG. 4 is a direct-type backlight module 4. Since the feature of this invention does not reside in other constitutional components, such as a reflection plate, an LCD module associated with the backlight module 4, etc., which may be readily appreciated by those skilled in the art, details of the same are omitted herein for the sake of brevity. In this preferred embodiment, the light source 3 may be one of an LED and a laser. The optical lens 1 is made from a material that has a relatively high light transmittance and that may be selected from the group consisting of polyethylene terephthalate (PET), polycarbonate (PC), polymethylmethacrylate (PMMA), polystyrene (PS), glass and combinations thereof. The optical lens 1 includes a light-entering surface 11, a light-exiting surface 12, and a modified reflection surface 13.

The light-entering surface 11 is disposed in proximity to the light source 3 for entrance of light from the light source 3, and defines a light-entering surface profile 21 on a cross section of the optical lens 1 along a plane that passes through the optical axis (L1). The light-entering surface profile 21 is concave in a direction away from the light source 3, and has a first opening 212 that opens toward the light source 3 and two first ends 211 that are respectively disposed on two opposite sides of the light source 3.

The light-exiting surface 12 is spaced apart from the light-entering surface 11 and remote from the light source 3, and defines a light-exiting surface profile 22 in the cross section of the optical lens 1. The light-exiting surface profile 22 is concave to define a second opening 222 that opens toward the light source 3 and that is relatively larger than the first opening 212, and has two second ends 221 that are respectively disposed on two opposite sides of the first ends 211 and remote from the light source 3.

The modified reflection surface 13 defines two modified reflection surface profiles 23 in the cross section of the optical lens 1. Each of the first ends 211 is connected to a corresponding one of the second ends 221 by a corresponding one of the modified reflection surface profiles 23. The modified reflection surface profiles 23 are concave in the same direction as the light-exiting surface profile 22. The light emitted from the light source 3 enters the light-entering surface 11 and exits the light-exiting surface 12 to transmit through the optical lens to the film substrate 41. Preferably, the light-entering surface profile 21 includes at least one segment in which a first distance between any point and the light source 3 decreases as a second distance between the point and the optical axis (L1) increases. The light-exiting surface profile 22 includes at least one segment in which a third distance between any point and the light source 3 increases as a fourth distance between the point and the optical axis (L1) increases. The third distance is increased as the fourth distance is increased.

Specifically, each of the modified reflection surface profile 23 has at least one section, and a connecting line from any point (P1) on the one section to the light source 3 forms an included angle (θ1) with respect to the optical axis (L1). Preferably, the included angle (θ1) is not less than 80 degrees. In this preferred embodiment, the modified reflection surface profile 23 includes a maximum distance point at one side of the corresponding one of the first ends 211 of the light-entering surface profile 21. The maximum distance point has a maximum distance (D0) from a reference plane (S1) that is perpendicular to the optical axis (L1) and that passes through the second ends 221 of the light-exiting surface profile 22. A projection point (P2) of the maximum distance point on the reference plane (S1) has a distance (D1) from a projection point of the one of the first ends 211 on the reference plane (S1). & ratio of (D0) to (D1) is smaller then 0.34. The distance (D1) ranges from 0.1 to 0.6 times of a projecting length of the modified reflection surface profile 23 projected onto the reference surface (S1).

Figure 6:
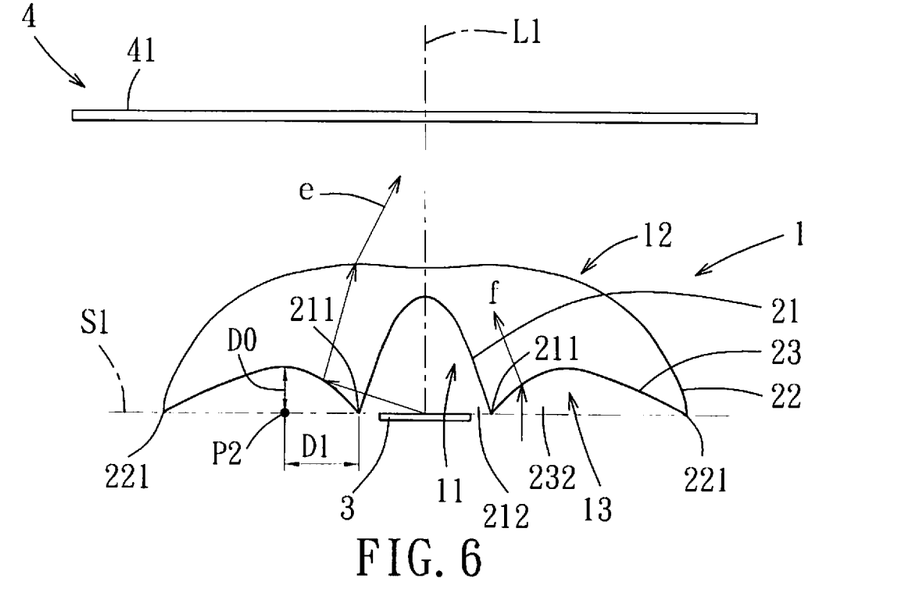
FIG. 6 is a schematic side view of the first embodiment, illustrating that a maximum distance point on a modified reflection surface profile of the optical lens has an overlong maximum distance from a reference plane that passes through the light source of the backlight module.

The light diffusion effect of the optical lens 1 can be improved by suitably increasing the maximum distance (D0) because a part of the light (a) reflected by the modified reflection surface 13 tends to be reflected away from the optical axis (L1). However, as shown in FIG. 6, if the maximum distance (D0) is unduly large, when a part of the light (e) passes through the light-entering surface 11, the modified reflection surface 13 reflects the part of the light (e) toward the optical axis (L1). A reflection of the part of the light (e) causes uneven brightness around the optical axis (L1) on the film substrate 41 to form a bright circular area. In addition, when a part of the light (f) not directly from the light source 3 enters a section of the modified reflection surface 13 in proximity to one side of the light-entering surface 11, that the modified reflection surface 13 reflects the part of the light (f) to the optical axis (L1) results in relatively high light intensity around the optical axis (L1) on the film substrata 41. To alleviate such reflection of the part of the light (f) toward the optical axis (L1), the ratio of D0/D1 is preferred to be limited so as to confine curvature of the modified reflection surface 13. Moreover, when a light emission angle of an LED as the light source 3 is greater than 160 degrees, the light intensity of the LED approximates to 0. Hence, the included angle ($\theta 1$) between any point (P1) on the one section of the modified reflection surface profile 23 to the LED is preferred to be limited to be not less than 80 degrees so as to reduce the reflection of the part of the light (f) toward the optical axis (L1). Experimentally, in addition to controlling the value of the inclined angle ($\theta 1$) and the ratio of D0/D1, when the distance (D1) ranges from 0.1 to 0.6 times of the projecting length of the modified reflection surface profile 23 projected onto the reference surface (S1), the light distribution on the film substrate 41 can be further improved.

Figure 7:
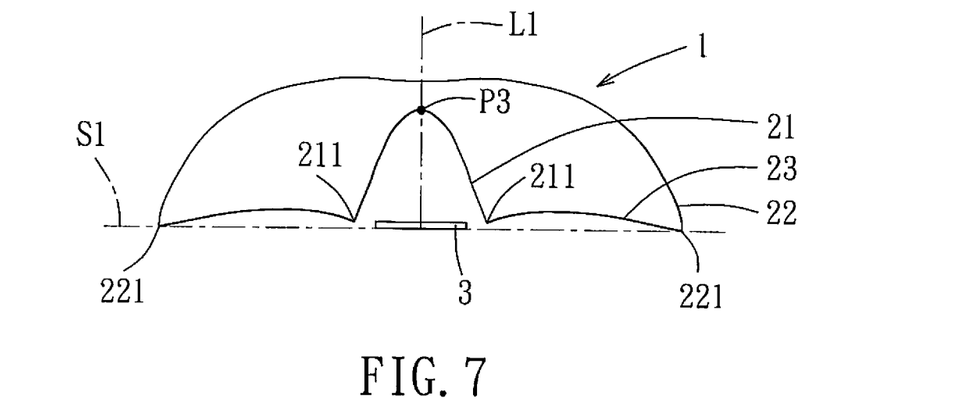
FIG. 7 is a schematic side view or a modification of the first embodiment, illustrating two first ends and a point on a light-entering surface profile of the optical lens through which an optical axis of the optical lens passes being situated on one side of the reference plane.
Figure 8:
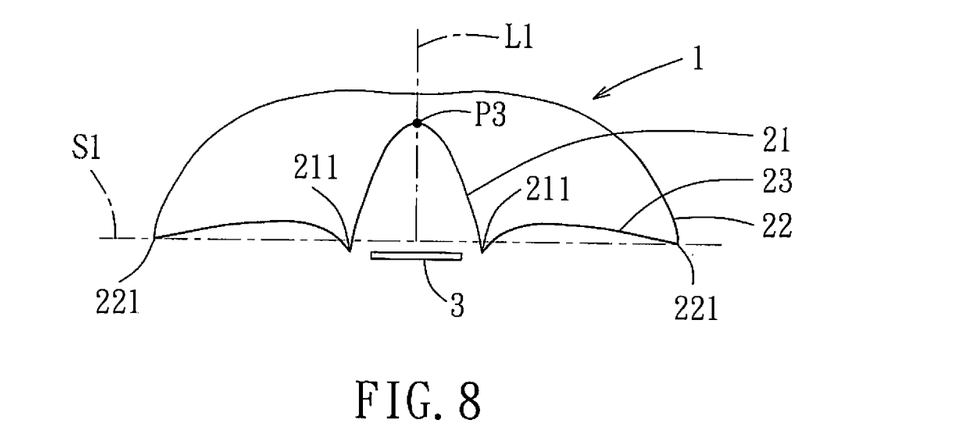
FIG. 8 is a schematic side view of another modification of the first preferred embodiment, illustrating the two first ends and the point of the light-entering surface profile of the optical lens through which the optical axis of the optical lens passes being situated on two opposite sides of the reference plane.

In this embodiment, the first ends 211 of the light-entering surface profile 21 and the second ends 221 of the light-exiting surface profile 22 are situated on the reference plane (S1) that passes through the light source 3. Alternatively, the second ends 221 of the light-exiting surface profile 22 may lie on the reference plane (S1) that passes through the light source 3, while the first ends 211 are offset from the reference plane (S1). As shown in FIG. 7, when the optical axis (L1) passes through the apex (P3) of the light-entering surface profile 21, the first ends 211 and the apex (P3) are disposed on a same side relative to the reference plane (S1) in order to facilitate assembly of the backlight module 4. In some embodiments, as shown in FIG. 8, the first ends 211 and the point (P3) are on opposite sides relative to the reference plane (S1) so as to comply with assembly tolerances of the backlight module 4.

Specifically, the light-exiting surface 12 has a section in proximity to the optical axis (L1). The section of the light-exiting surface 12 may be concave, flat (not shown), or convex (not shown) relative to the reference plane (S1), A concave design of the section of the light-exiting surface 12 is primarily intended to cooperate with the film substrate 41 of a diffusion plate of the backlight module 4 so as to scatter the light proximate to the optical axis (L1) in a direction away from the optical axis (L1). In some embodiments, in order to scatter the light to a relatively great extent (increasing the size of the light spot), the film substrate 41 of the diffusion plate of the backlight module 4 may have a special design. However, such a special design of the film substrate 41 of the diffusion plate of the backlight module 4 may diminish light intensity in proximity to the optical axis (L1). One of flat and convex designs of the section of the light-exiting surface 12 is adjustable to direct the scattered light for balancing the light intensity proximate to the optical axis (L1). Although the diffusion plate of the backlight module 4 is used to solve the problem of excessive brightness, it is unable to resolve a shadow area defect. By virtue of the design of the section of the light-exiting surface 12, the backlight module 4 has an even light distribution.

Since the optical lens 1 has a symmetrical shape with respect to the optical axis (L1), the optical lens 1 is able to direct light in the following three light paths:

1. When the part of the light emitted from the light source 3 passes through the light-entering surface 11, the light-entering surface 11 reflects the part of the light (a) to the light-exiting surface 12 in a direction away from the optical axis (L1). When the light-exiting surface 12 reflects the part of the light (a) to the modified reflection surface 13, the modified reflection surface 13 reflects the part of the light (a) in the direction away from the optical axis (L1), such that the light intensity is reduced around the optical axis (L1) and such that the part of the light (a) is evenly distributed on the film substrate 41 in proximity to the optical axis (L1).

2. When a part or the light (b) emitted from the light source 3 passes through the light-entering surface 11, the light-entering surface 11 reflects the part of the light (b) to the light-exiting surface 12 in a direction away from the optical axis (L1). The light-exiting surface 12 reflects the part of the light (b) in the direction away from the optical axis (L1), such that the part of the light (b) is scattered on the film substrate 41.

3. When a part of the light (c) not directly from the light source 3 passes through the modified reflection surface 13, by virtue of one of the modified reflection surface profiles 23, the modified reflection surface 13 reflects the part of the light (c) in the direction away from the optical axis (L1), such that the part of the light (c) is scattered.

Figure 9:
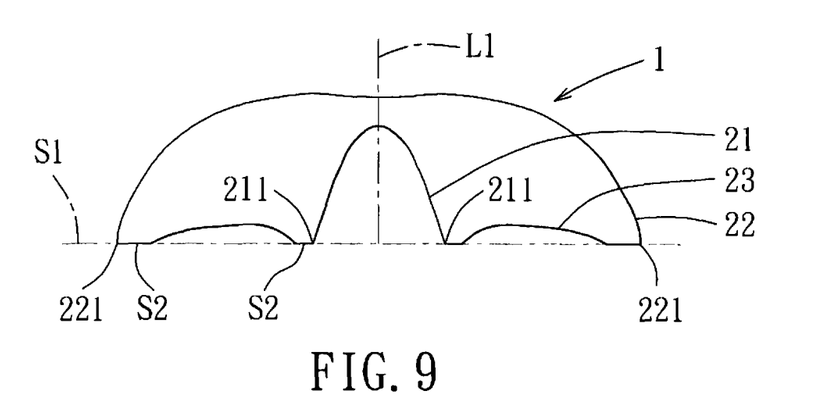
FIG. 9 is a schematic side view of the second preferred embodiment of an optical lens according to the present invention.

FIG. 9 shows the second preferred embodiment of the optical lens 1 according to the present invention, which has a structure generally similar to that of the first preferred embodiment. However, in this embodiment, in order to increase processing efficiency of the optical lens 1, each of the modified reflection surface profiles 23 has at least one planar portion (S2) that is proximate to at least one of the corresponding one of the first ends 211 and the corresponding one of the second ends 221, and that is perpendicular to the optical axis (L1). Preferably, the planar portion (S2) is situated on the reference plane (S1) that passes through the light source 3.

Figure 10:
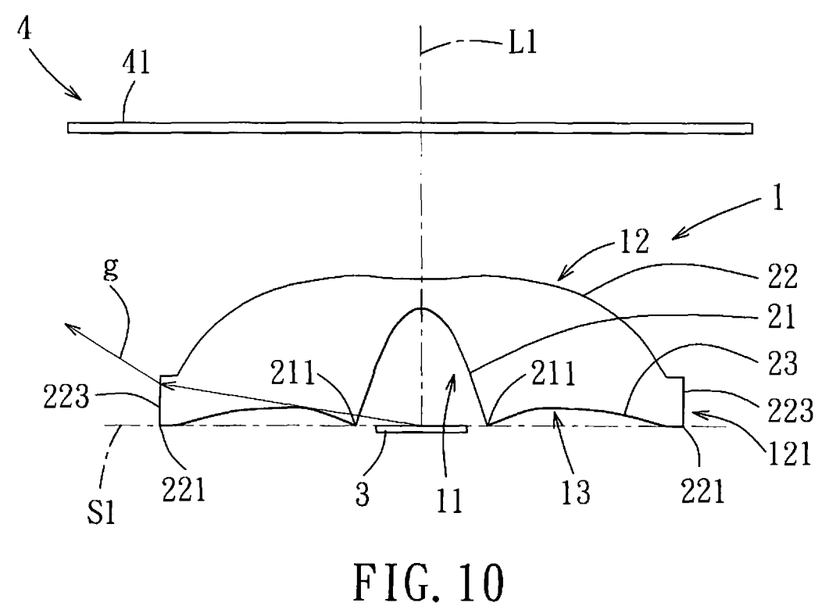
FIG. 10 is a schematic side view of the third preferred embodiment of an optical lens according to the present invention.

FIG. 10 shows the third preferred embodiment of the backlight module 4 according to the present invention, which has a structure generally similar to that of the first preferred embodiment. However, in this embodiment, the light-exiting surface profile 22 of the optical lens 1 has two upright segments 223 that respectively extend from the second ends 221 in a direction opposite to the second opening 222 and that are parallel to the optical axis (L1). When a part of the light (g) emitted by the light source 3 has a relatively large included angle from the optical axis (L1), the part of the light (g) passes through the light-entering surface 11 to a corresponding one of the upright segments 223. The corresponding one of the upright segments 223 reflects the part of the light (g) to the film substrate 41 in a direction away from the reference plans (S1). By virtue of a design that the optical lens 1 has the upright segments 223, the optical lens 1 is sufficient to use the part of the light (g) for evenly distributing light on the film substrate 41. In this preferred embodiment, since the optical lens 1 has the symmetrical shape relative to the optical axis (L1), i.e., the light-exiting surface 12 further has a cylindrical portion 121 that surrounds the optical axis (L1). The cylindrical portion 121 defines the two upright segments 223 in the cross section of the optical lens 1.

To sum up, by virtue of the overall design of the optical lens 1 described above, the part of the light (a) emitted from the light source 3 is secondarily reflected from the modified reflection surface 13 in the direction away from the optical axis (L1). The part of the light (c) not directly from the light source 3 passes through and is reflected by the modified reflection surface 13 in the direction away from the optical axis (L1). Therefore, the optical lens 1 is able to reduce relatively high light intensity around the optical axis (L1), and thus, enables the film substrate 41 to have even light distribution, thereby achieving the object of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical lens adapted for use with a light source that has an optical axis, comprising:
    a light-entering surface adapted to be disposed in proximity to the light source for entrance of light from the light source, said light-entering surface defining a light-entering surface profile on a cross section of the optical lens along a plane that passes through the optical axis, said light-entering surface profile being concave in a direction away from the light source, and having a first opening that opens toward the light source and two first ends that are respectively disposed on two opposite sides of the light source;
    a light-exiting surface spaced apart from said light-entering surface and remote from the light source, said light-exiting surface defining a light-exiting surface profile in the cross section of the optical lens, said light-exiting surface profile being concave to define a second opening that opens toward the light source and that is relatively larger than said first opening, and having two second ends respectively disposed on two opposite sides of said first ends and remote from the light source; and
    a modified reflection surface defining two modified reflection surface profiles in the cross section of the optical lens, each of said first ends being connected to a corresponding one of said second ends by a corresponding one of said modified reflection surface profiles, said modified reflection surface profiles being concave in the same direction as said light-exiting surface profile,
    wherein said modified reflection surface profile has at least one section, and a connecting line from any point on said one section to the light source forms an included angle with respect to the optical axis, said included angle being larger than or equal to 80 degrees, and
    wherein each of said modified reflection surface profile includes a maximum distance point at one side of the corresponding one of said first ends of said light-entering surface profile, said maximum distance point having a maximum distance (D0) from a reference plane that is perpendicular to the optical axis and that passes through said second ends of said light-exiting surface profile, a projection point of said maximum distance point on said reference plane having a distance (D1) from a projection point of said one of said first ends on said reference plane, a ratio of (D0) to (D1) being smaller than 0.34, said distance (D1) ranging from 0.1 to 0.6 times of a projecting length of said modified reflection surface profile projected onto said reference surface.

2. The optical lens as claimed in claim 1, wherein said light-entering surface profile includes at least one segment in which having a first distance between any point and the light source decreases as a second distance between the point and the optical axis increases, said light-exiting surface profile including at least one segment in which a third distance between any point and the light source increases as a fourth distance between the point and the optical axis increases.

3. The optical lens as claimed in claim 1, in which the optical lens has a symmetrical shape with respect to the optical axis.

4. The optical lens as claimed in claim 1, wherein each of said modified reflection surface profiles has at least one planar portion that is proximate to at least one of the corresponding one of said first ends and the corresponding one of said second ends, and that is perpendicular to the optical axis.

5. The optical lens as claimed in claim 1, wherein said light-exiting surface profile has two upright segments that respectively extend from said second ends in a direction opposite to said second opening and that are parallel to the optical axis.

6. The optical lens as claimed in claim 5, in which the optical lens has a symmetrical shape relative to the optical axis, wherein said light-exiting surface further has a cylindrical portion that surrounds the optical axis, said cylindrical portion defining two upright segments in the cross section of the optical lens.

7. The optical lens as claimed in claim 1, wherein said first ends of said light-entering surface profile and said second ends of said light-exiting surface profile are situated on said reference plane that passes through the light source.

8. The optical lens as claimed in claim 1, wherein said second ends of said light-exiting surface profile lie on said reference plane that passes through the light source, said first ends being offset from said reference plane.

9. A backlight module comprising:
    a film substrate;
    at least one light source that has an optical axis; and
    an optical lens disposed between said film substrate and said light source, said optical lens including
    a light-entering surface disposed in proximity to said light source for entrance of light from said light source, said light-entering surface defining a light-entering surface profile on a cross section of said optical lens along a plane that passes through said optical axis, said light-entering surface profile being concave in a direction away from said light source, and having a first opening that opens toward said light source and two first ends that are respectively disposed on two opposite sides of said light source,
    a light-exiting surface spaced apart from said light-entering surface and remote from said light source, said light-exiting surface defining a light-exiting surface profile in said cross section of said optical lens, said light-exiting surface profile being concave to define a second opening that opens toward said light source and that is relatively larger than said first opening, and having two second ends respectively disposed on two opposite sides of said first ends and remote from said light source, and
    a modified reflection surface defining two modified reflection surface profiles in the cross section of said optical lens, each of said first ends being connected to a corresponding one of said second ends by a corresponding one of said modified reflection surface profiles, said modified reflection surface profiles being concave in the same direction as said light-exiting surface profile,
    wherein the light emitted from said light source enters said light-entering surface and exits the light-exiting surface to transmit through said optical lens to said film substrate (41),
    wherein said modified reflection surface profile has at least one section, and a connecting line from any point on said one section to said light source forms an included angle with respect to said optical axis, said included angle being larger than or equal to 80 degrees, and wherein each of said modified reflection surface profiles includes a maximum distance point at one side of the corresponding one of said first ends of said light-entering surface profile, said maximum distance point having a maximum distance (D0) from a reference plane that is perpendicular to said optical axis and that passes through said second ends of said light-exiting surface profile, a projection point of said maximum distance point on said reference plane having a distance (D1) from a projection point of the corresponding one of said first ends on said reference plane, a ratio of (D0) to (D1) being smaller than 0.34, said distance (D1) ranging from 0.1 to 0.6 times of a projecting length of said modified reflection surface profile projected onto said reference surface.

10. The backlight module as claimed in claim 9, wherein said light-entering surface profile includes at least one segment in which a first distance between any point and said light source decreases as a second distance between the point and said optical axis increases, said light-exiting surface profile including at least one segment in which a third distance between any point and said light source increases as a fourth distance between the point and said optical axis increases.

11. The backlight module as claimed in claim 9, in which said optical lens has a symmetrical shape with respect to said optical axis.

12. The backlight module as claimed in claim 9, wherein each of said modified reflection surface profiles has at least one planar portion that is proximate to at least one of the corresponding one of said first ends and the corresponding one of said second ends, and that is perpendicular to said optical axis.

13. The backlight module as claimed in claim 12, wherein said light-exiting surface profile has two upright segments that respectively extend from said second ends in a direction opposite to said second opening and that are parallel to said optical axis.

14. The backlight module as claimed in claim 13, in which said optical lens has a symmetrical shape relative to said optical axis, wherein said light-exiting surface further has a cylindrical portion that surrounds said optical axis, said cylindrical portion defining two upright segments in said cross section of said optical lens.

15. The backlight module as claimed in claim 9, wherein said first ends of said light-entering surface profile and said second ends of said light-exiting surface profile are situated on said reference plane that passes through said light source.

16. The backlight module as claimed in claim 9, wherein said second ends of said light-exiting surface profile lie on said reference plane that passes through said light source, said first ends being offset from said reference plane.

* * * * *

UNITED STATES PATENT AND TRADEMARK OFFICE
CERTIFICATE OF CORRECTION

PATENT NO. : 9,146,018 B2
APPLICATION NO. : 13/930990
DATED : September 29, 2015
INVENTOR(S) : Li et al.

Page 1 of 1

It is certified that error appears in the above-identified patent and that said Letters Patent is hereby corrected as shown below:

On the title page of the patent, the name of the Applicant appearing at Item (71) is incorrect. The name of the Applicant should be "TPV Display Technology (Xiamen) Co., Ltd.".

Signed and Sealed this
Twenty-first Day of June, 2016

Michelle K. Lee
*Director of the United States Patent and Trademark Office*